United States Patent
Pfeifer et al.

(10) Patent No.: US 9,031,998 B2
(45) Date of Patent: May 12, 2015

(54) ANALYTICS ENABLEMENT OBJECTS

(75) Inventors: Wolfgang Pfeifer, Kerzenheim (DE);
Ivo Vollrath, Waghäusel (DE); Dirk Baumgaertel, Hockenheim (DE); Baré Said, Sankt Leon-Rot (DE)

(73) Assignee: SAP SE, Walldorf (DE)

( * ) Notice: Subject to any disclaimer, the term of this patent is extended or adjusted under 35 U.S.C. 154(b) by 884 days.

(21) Appl. No.: 12/345,825

(22) Filed: Dec. 30, 2008

(65) Prior Publication Data

US 2010/0169387 A1   Jul. 1, 2010

(51) Int. Cl.
*G06F 17/30* (2006.01)
*G06F 9/54* (2006.01)

(52) U.S. Cl.
CPC ..................... *G06F 9/542* (2013.01)

(58) Field of Classification Search
None
See application file for complete search history.

(56) References Cited

U.S. PATENT DOCUMENTS

| | | | | |
|---|---|---|---|---|
| 5,724,575 A | * | 3/1998 | Hoover et al. | 707/999.01 |
| 5,872,973 A | * | 2/1999 | Mitchell et al. | 719/332 |
| 5,918,232 A | * | 6/1999 | Pouschine et al. | 707/999.002 |
| 6,023,271 A | * | 2/2000 | Quaeler-Bock et al. | 715/866 |
| 6,032,153 A | * | 2/2000 | Sadiq et al. | 707/999.008 |
| 6,831,668 B2 | * | 12/2004 | Cras et al. | 715/853 |
| 7,099,727 B2 | * | 8/2006 | Wu et al. | 700/104 |
| 7,275,024 B2 | * | 9/2007 | Yeh et al. | 703/2 |
| 7,356,779 B2 | * | 4/2008 | Cras et al. | 715/853 |
| 7,546,257 B2 | * | 6/2009 | Hoffman et al. | 705/28 |
| 7,571,082 B2 | * | 8/2009 | Gilpin et al. | 703/6 |
| 7,596,523 B2 | * | 9/2009 | Sobel et al. | 705/36 R |
| 2004/0030716 A1 | * | 2/2004 | Hoth et al. | 707/999.103 |
| 2005/0234976 A1 | * | 10/2005 | Oara et al. | 707/999.103 |
| 2006/0293934 A1 | * | 12/2006 | Tsyganskiy et al. | 705/7 |
| 2007/0169016 A1 | * | 7/2007 | Aakolk et al. | 717/136 |
| 2008/0141237 A1 | * | 6/2008 | Elad et al. | 717/171 |
| 2013/0036115 A1 | * | 2/2013 | Schwarz et al. | 707/736 |

* cited by examiner

*Primary Examiner* — Syed Hasan
(74) *Attorney, Agent, or Firm* — Buckley, Maschoff & Talwalkar LLC

(57) ABSTRACT

A method and system, the method may include generating a change notification in response to a change of at least one attribute associated with at least one node of a host business object (BO); and updating, based on the generated change notification, an analytic enablement object (AEO) class of business object having derived attributes based on the at least one attribute of the host BO and representing transformations of the at least one attribute.

16 Claims, 4 Drawing Sheets

ANALYTICS ENABLEMENT OBJECTS

FIELD

Some embodiments relate to business objects supported by a business process platform. More specifically, some embodiments relate to Analytics Enablement Objects class of business objects within a business process platform.

BACKGROUND

A business object (BO) is a software entity representing real-world items used during the transaction of business. BOs are model-based data structures and may include any suitable data structure. For example, a business object may represent a business process or a business document such as a sales order, a purchase order, or an invoice. A BO may also represent items such as a product, a business partner, or a piece of equipment. A BO may capture a business process that extends across multiple business entities, departments, and organizations. The structure of a BO may be determined based on the requirements of a business scenario in which the business object is to be deployed.

Business analytics based on gathered and stored business related data may provide insights into the business processes and operations of the business. The data, or portions of the data, may be represented by BOs. Analytics may include transforming the gathered and stored data regarding a business in order to gain insights to the business processes related to the data. Business analytics may be used by a business to generate meaningful and timely insights into business processes.

Conventionally, transformations related to generating business analytics may be performed when the underlying data is searched, queried, and/or retrieved in fulfillment of the generating the desired business analytics. However, certain transformations may be repeated numerous times in generating, for example, certain business analytic reports that are repeatedly generated. Also, as the complexity and breadth of business data related to a business or enterprise expands, so too does the time and resources required to perform the transformations related to generating business analytics.

Accordingly, an efficient mechanism for representing and implementing transformations related to business objects, is addressed by some embodiments herein.

DETAILED DESCRIPTION

Figure 1:
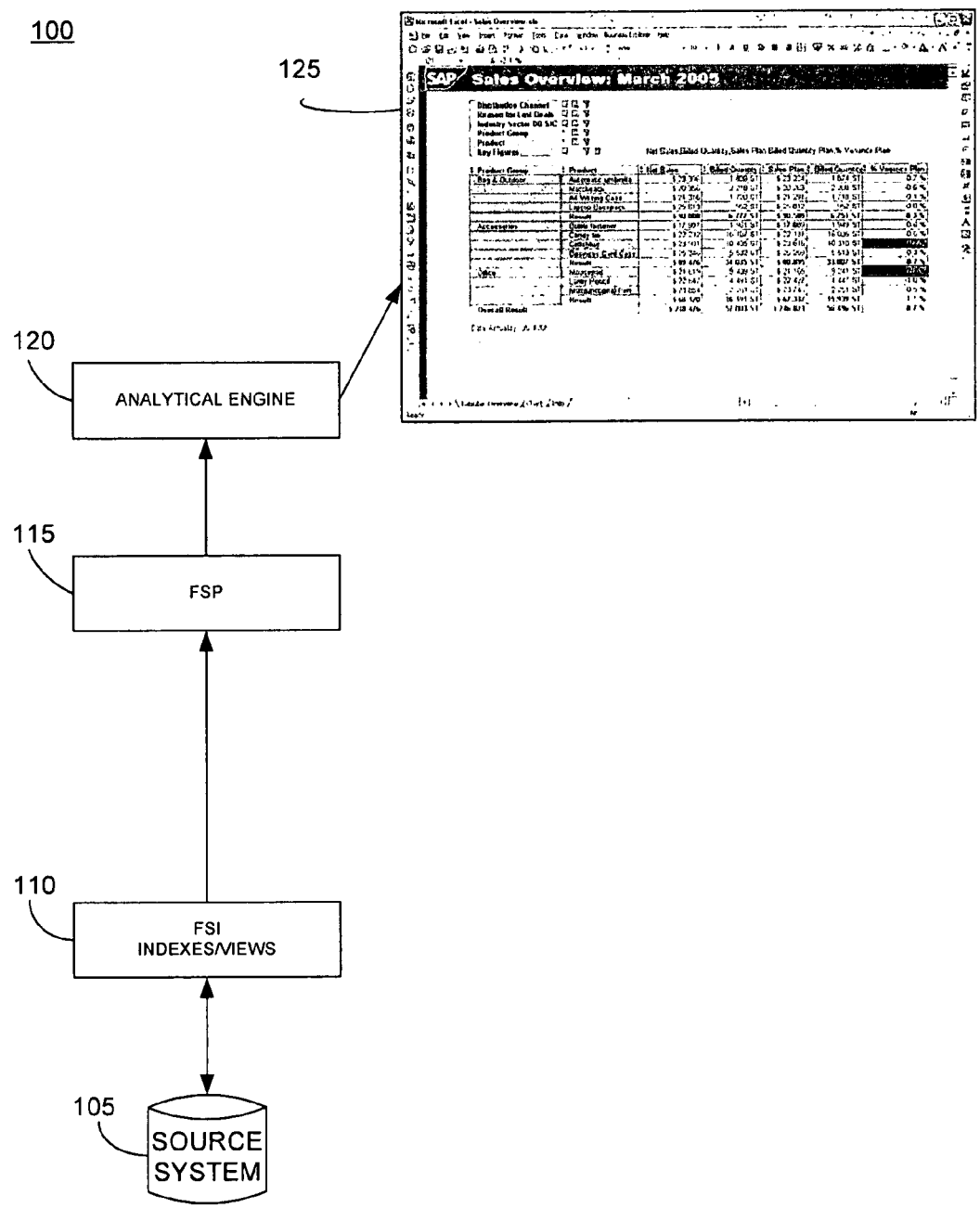
FIG. 1 is a block diagram of an operating environment suitable for supporting various aspects of the present disclosure.

FIG. 1 is a block diagram of system 100 according to some embodiments. System 100 includes a source system 105 that stores business related data interfaced with a business application, service, or application such as, for example, Fast Search Infrastructure (FSI) 110 provided by SAP AG. It is noted that the present disclosure is not limited to FSI 110 and other indexes of data that can be interfaced with a business platform infrastructure may be used. In some embodiments, a persistence of a class of BOs referred to herein as Analytics Enablement Objects (AEO) is established and maintained in the indexes of the FSI 110. AEOs are predefined data structures representing transformations of BO data and based on at least one core BO. According to some embodiments herein, the persistence of the AEO's maintained in the FSI indexes is derived from a secondary persistence of the BO represented in the FSI indexes. That is, in some embodiments, a secondary persistence only is provided for the AEO's.

Fast Search Provider (FSP) 115 is a service that implements and executes the transformations represented by the AEOs herein. In some instances, FSP 115 may be referred to a "virtual service" in the sense that no AOE data is replicated by FSP 115. Analytical engine 120 takes the transformations executed by FSP 115 and generates analytical reports. As an example, a Sales Overview 125 is shown in FIG. 1 to demonstrate an example of a type of analytics report or document that may be generated based on the AEOs herein to provide insight into the operation of a business.

Figure 2:
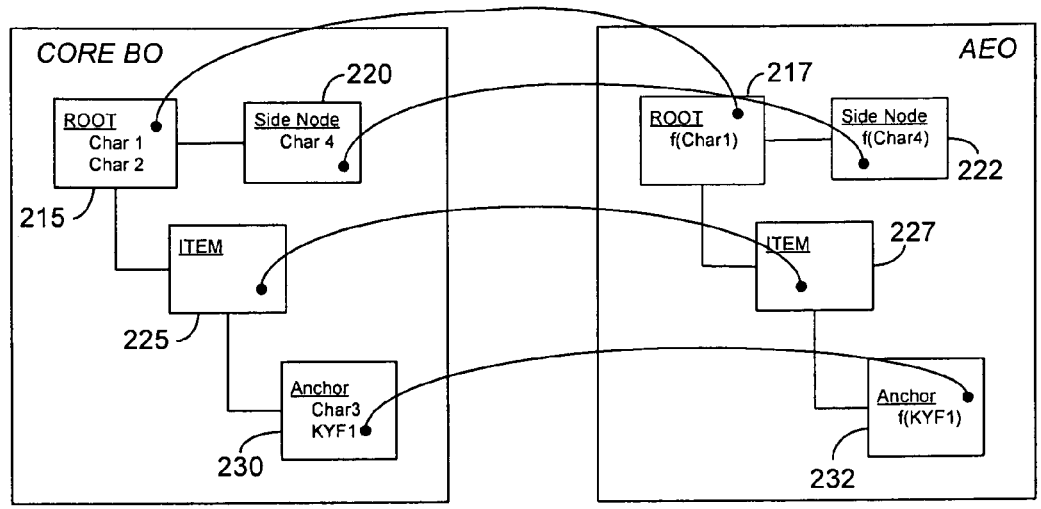
FIG. 2 is an exemplary depiction of a core BO and an AEO, according to some embodiments.

FIG. 2 provides an illustrative depiction 200 of an AEO, in accordance with some embodiments. As shown, AEO 210 is based on or derived from core BO 205. In this particular example, the structure of AEO 210 mirrors the structure of core BO 205 that includes a root node 215, a side note 220, and other nodes 225 and 230. AEO root node 217 corresponds to BO root node 215 and defines a function based on the attribute "CHAR1" of the BO root node 215. AEO side node 222 corresponds to BO side node 220 and defines a function based on the attribute "CHAR4" of the BO side node 220. AEO node 227 corresponds to BO node 225, but it is empty (i.e., does not define or represent any transformation of an attribute or association of the core BO). Also, AEO node 232 corresponds to BO node 230 and defines a function that uses the BO attribute "KYF1" as a parameter in the transformation. Derived attributes of AEO 210 are located at the node of core BO 205 that carries the original field or a main original field if a computation or function depends on more than one field. In some embodiments, the computations and calculations defined in an AEO may be complex and may depend on data from one or more BOs. In some aspects, AEOs may represent an aggregation of data since, for example, one AEO may reference more than one BO.

Figure 3:
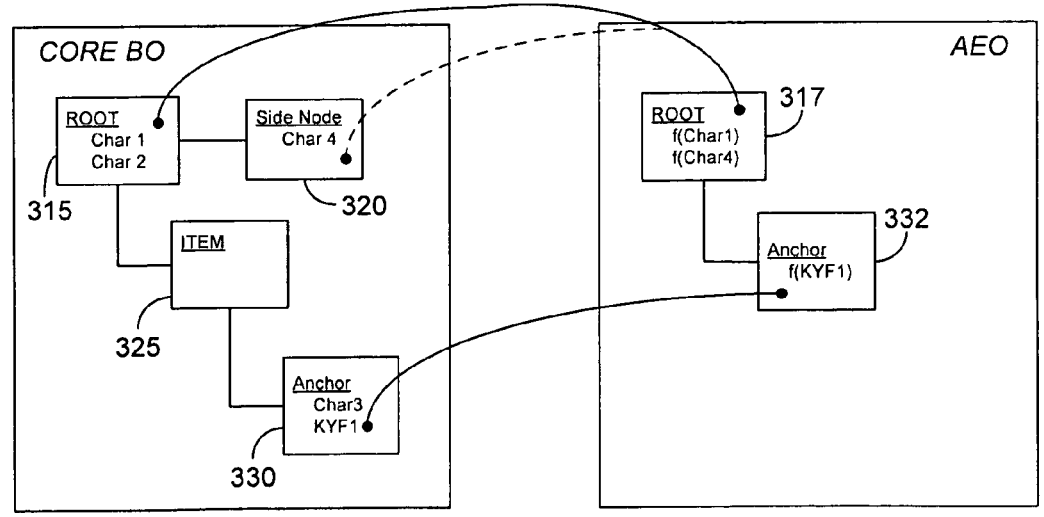
FIG. 3 is another exemplary depiction of a core BO and an AEO, according to some embodiments herein.

FIG. 3 provides an illustrative depiction 300 of an AEO, in accordance with some embodiments. As shown, AEO 310 is based on or derived from core BO 305. In this example, the structure of AEO 310 does not strictly mirror the structure of core BO 305. While core BO 305 includes a root node 315, a side note 320, and other nodes 325 and 330 AEO 310 only includes root node 317 that corresponds to BO root node 315 and anchor node 332 that corresponds to core BO 305 anchor node 330. It is noted that this compressed structural copy of the BO represented by AEO 310 does not include any empty nodes or side nodes. That is, AEO only includes references to those nodes needed to define the transformations of AEO 310. In some embodiments, root node 317 may be included or otherwise specified in AEO 310, even in an instance it is empty. In some instances, inclusion of AEO root node 317, whether empty or not, provides a mechanism for facilitating the proper defining of the AEO. In some embodiments, the relationship of the nodes of AEO 310 may be specified and maintained with reference to root node 317.

In some embodiments, an AEO is registered to change notifications of the underlying BOs from which the AEO is derived. A change in an underlying BO may be accounted for by a corresponding AEO so that transformations represented by the AEO will accurately reflect and capture changes to the underlying business data represented by the BOs. In this manner, analytics generated using AEOs in accordance with embodiments herein may be based on updated, current business data.

In some embodiments, an AEO may be configured by defining the host or core BO for the AEO, including registering the AEO to be notified of change notifications of the core BO. The configuration process may further include configuring the relationship between the host BO nodes and the AEO nodes. Additionally, the transformations that define how the values of the AEO nodes are calculated may be maintained. This aspect of the AEO configuration may include defining access paths on the host BO side for the attributes which are the input parameters for the transformations and assigning the export parameters of the transformations to the attributes of the AEO nodes.

Figure 4:
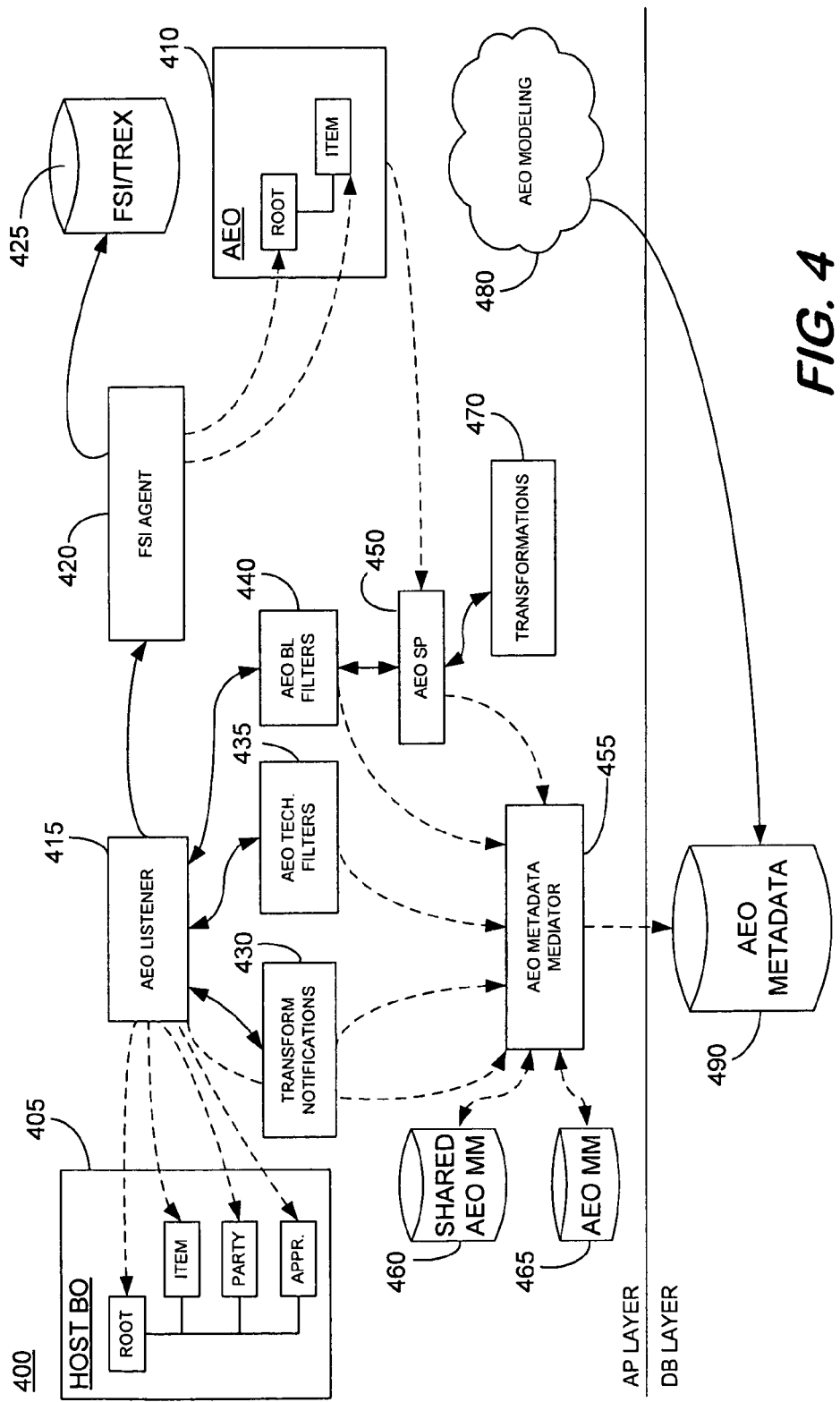
FIG. 4 is a detailed block diagram of a system according to some embodiments.

FIG. 4 is a detailed block diagram of a system 400 according to some embodiments, including components for tracking changes to BOs having corresponding AEOs. System 400 includes, in general, an application platform (AP) layer 401 and a database (DB) layer 402. AP layer 401 includes a host or core BO 405 and an AEO 410 that is derived (at least in part) from BO 405 and the attributes and associations of BO 405 represented by the nodes of the BO. AEO listener 415 monitors the root node and other nodes of BO 405 for any changes to the nodes. In some embodiments, an AEO listener may be provided to monitor changes in one or more BOs. In some embodiments, AEO listener 415 may monitor all BOs associated with a business AP.

A change to a monitored BO results in a change notification being generated by AEO listener 415. One task of AEO listener 415 may be to determine the AEOs affected by the change(s) to the monitored BOs. The change notification generated in response to a change in BO 405 is passed along to FSI agent 420. FSI agent 420 may retrieve data from the nodes of AEO 410 and updates index(es) FSI/TREX 425. For example, the nodes of AEO 410 that are impacted by a change of underlying BO 405 are updated to reflect and capture the changes made to the underlying corresponding nodes of the BO. In some embodiments, AEO 410 does not have a persistence on the DB layer 402, but only has a persistence in index 425. In this manner, a call to DB layer 402 is not necessary in order to update attributes and associations (i.e., nodes) of AEO 410 and maintain the correspondence between BO 405 and AEO 410.

AEO technical filter 435 determines which BO changes are relevant to the AEOs related to AEO listener 415. AEO technical filter 435 considers whether a change in host BO 405 impacts AEO 410. In some aspects, AEO technical filter 435 operates to minimize the number of updates on AEO 410.

AEO business logic (BL) filter 440 determines, based on a business decision, consideration, and other data, which host BO changes should be accounted for by AEO 410. In contrast to AEO technical filter 435, AEO BL filter 440 does not determine whether a change to the host BO 405 corresponds to a change to AEO 410 based on the occurrence of the BO change and a related correspondence of AEO 410. A BL filter may be established, for example, by a user to filter out all BO changes except for those BO changes related to certain types of BOs (e.g., purchase orders, sales, etc.). In this manner, AEO BL filter 440 may operate to selectively limit updates on AEO 410 based on whether or not the change meets certain business logic considerations.

In some embodiments, Transformations Notifications 430 is a service AEO Listener 415 and tasked to transform a BO change notification into an AEO change notification.

AEO listener 415 may also monitor or detect changes to BO 405 and translate a BO change notification into an AEO change notification. The AEO change notification may be forwarded to FSI Agent 420 by AEO listener 415.

AEO Metadata Mediator 455 may be a service provider that provides access to the AEO metadata during runtime. In some embodiments, there may be two possibilities to access AEO metadata, either a Shared AEO MM 460 or a AEO MM 465. A difference between the implementations to access the AEO is that memory consumption may be lower and better performance may be had with the Shared AEO MM 460 implementation as compared to the AEO MM 465 implementation where performance, at least for a first access, may be slower. The AEO MM 465 implementation may be used in an instance the Shared AEO MM 460 implementation is not available. In some aspects, AEO Metadata Mediator 455 behaves like a facade to hide the actual used implementation of the AEO metadata repository access. AEO Metadata Mediator 455 stores the AEO metadata itself, notwithstanding the implementation of the AEO metadata repository access. The AEO metadata is stored in AEO metadata database 490.

In some embodiments, AEO service provider (SP) 450 handles the task of retrieving the import parameter of transformations 470. SP 450 retrieves the transformation import parameters based on the calculations specified or defined by AEO 410. Transformations 470 may be provided centrally or locally by an application, service, or program. The AEO metadata database 490 includes input from AEO modeling 480 that includes a metadata descriptive of the configuration of AEO 410.

Figure 5:
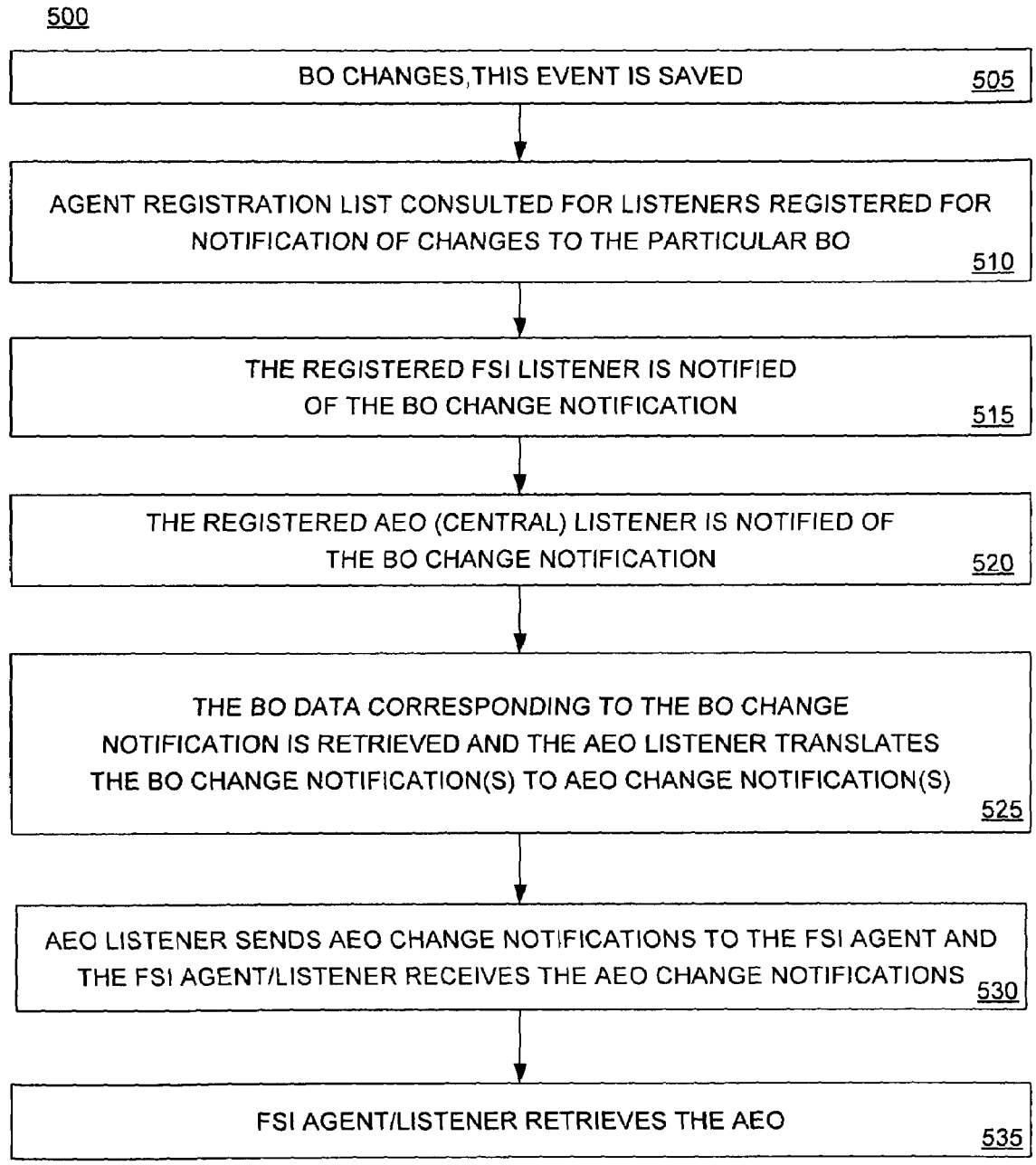
FIG. 5 is a flow diagram illustrating various aspects of the present disclosure, in accordance with some embodiments.

FIG. 5 is a flow diagram of a process or sequence of operations 500, related to identifying changes in an association of a BO and corresponding changes in related AEOs. At operation 505, a change to a BO is noted and the changed event is saved. AEO listener 415 may participate in this aspect of the process. At operation 510, an agent registration list may be consulted to determine whether there are any listeners (e.g., AEO listener 415) registered for notification of changes to the particular BO of the change event. In the event a FSI listener is registered for the particular BO, then the FSI listener is notified of the BO change. In the event an AEO listener is registered for the particular BO, then the AEO listener 415 is notified of the BO change notification at operation 520.

At operation 525, the BO data corresponding to the BO change notification is retrieved from a BO database. In some instances, the BO data corresponding to the BO change notification may be retrieved from an index of the AP layer 401 when the BO data has been previously loaded and replicated in an index of the AP layer. Also, AEO listener 415 translates the BO notification(s) into corresponding AEO change notification(s). In some embodiments, the AEO Listener uses AEO technical filters 435 and BL filters 440 in order to determine the relevant AEO changes.

At operation 530, the AEO listener sends AEO change notifications to the FSI agent and the FSI agent/listener receives the AEO change notifications. At operation 535, the FSI agent retrieves relevant AEO data from the AEO nodes (root nodes and children nodes) and updates the FSI/TREX indexes.

Each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer implemented method, the method comprising:
   configuring an analytic enablement object (AEO) class of business object, the AEO representing transformations of business object (BO) data and having at least one node, one or more of the at least one AEO node having at least one derived attribute based on a transformation of at least one core business object (BO), the configuring comprising:
      specifying the at least one core BO on which the AEO bases its attributes, the at least one core BO being a model-based data structure representation of data persisted on a database, where each core BO has at least one node and the at least one BO node has at least one attribute;
      defining a relationship between the at least one core BO and the AEO, where the relationship specifies at least one node of the at least one core BO on which the at least one AEO derived attribute is based;
      defining transformations represented by the at least one AEO derived attribute, the transformations being a function including at least one of a calculation and a computation of at least one attribute of the at least one core BO;
   generating a change notification in response to a change of at least one attribute associated with at least one node of the at least one core BO, the at least one core BO being monitored for a change;
   updating, based on the generated change notification, an instance of the AEO, the updated AEO reflecting the change to the at least one attribute of the at least one core BO in its transformation of the at least one attribute of the at least one core BO; and
   maintaining a persistence of the updated AEO in an index of a secondary persistence of the core BO.

2. The computer implemented method of claim 1, wherein a node structure of the AEO mirrors, at least in part, a node structure of the at least one core BO.

3. The computer implemented method of claim 2, wherein the node structure of the AEO does not include empty nodes and nodes corresponding to side nodes of the at least one core BO.

4. The computer implemented method of claim 1, further comprising informing the AEO of the change notification.

5. The computer implemented method of claim 4, further comprising selectively limiting whether the AEO is informed of the change notification based on business logic considerations.

6. The computer implemented method of claim 1, wherein the AEO aggregates data related to attributes derived from more than one of the at least one core BO.

7. The computer implemented method of claim 1, wherein a persistence of the updated AEO is not maintained on the database.

8. The computer implemented method of claim 1, further comprising monitoring the at least one core BO for a change.

9. A non-transitory medium having computer-executable program instructions stored thereon, the medium comprising:
   instructions for storing a persistence of at least one core business object (BO), where each core BO has at least one node and the at least one BO node has at least one attribute, the at least one core BO being a model-based data structure, a representation of data persisted on a database, and monitored for a change;
   instructions for configuring an analytical enablement object (AEO) class of business object, the AEO representing transformations of business object (BO) data and having at least one node, one or more of the at least one AEO node having at least one derived attribute based on a transformation of the at least one core BO, the configuring comprising:
      specifying the at least one core BO on which the AEO bases its attributes;
      defining a relationship between the at least one core BO and the AEO, where the relationship specifies at least one node of the at least one core BO on which the at least one AEO derived attribute is based; and
      defining transformations represented by the at least one AEO derived attribute, the transformations being a function including at least one of a calculation and a computation of at least one attribute of the at least one core BO;
   instructions for a listener mechanism to monitor the at least one core BO for changes to at least one attribute and to inform the AEO of change notifications related to the changes to the at least one attribute of the at least one core BO;
   instructions to update, based on the change notifications, the AEO; and
   instructions to maintain a persistence of the updated AEO in an index derived from a secondary persistence of the at least one core BO.

10. The medium according to claim 9, wherein a node structure of the AEO mirrors, at least in part, a node structure of the at least one core BO.

11. The medium according to claim 10, wherein the node structure of the AEO does not include empty nodes and nodes corresponding to side nodes of the at least one core BO.

12. The medium of claim 9, further comprising instructions for business logic (BL) filters to selectively limit the change notifications sent to the AEO based on business logic considerations.

13. The medium of claim 9, wherein the AEO aggregates data related to attributes derived from more than one BO of the at least one core BO.

14. The medium of claim 9, wherein the listener mechanism monitors all BOs associated with the AEO.

15. The medium of claim 9, wherein a persistence of the updated AEO is not maintained on the database.

16. The medium of claim 9, further comprising instructions to monitor the at least one core BO for a change.

* * * * *